(12) United States Patent
Colotte et al.

(10) Patent No.: US 8,240,124 B2
(45) Date of Patent: Aug. 14, 2012

(54) METHOD OF TAKING OFF AUXILIARY POWER FROM AN AIRPLANE TURBOJET, AND A TURBOJET FITTED TO IMPLEMENT SUCH A METHOD

(75) Inventors: Baptiste Colotte, Melun (FR); Jean Pierre Galivel, Savigny le Temple (FR); Zoltan Zsiga, Avon (FR)

(73) Assignee: Snecma, Paris (FR)

( * ) Notice: Subject to any disclaimer, the term of this patent is extended or adjusted under 35 U.S.C. 154(b) by 1158 days.

(21) Appl. No.: 12/031,194

(22) Filed: Feb. 14, 2008

(65) Prior Publication Data

US 2010/0000223 A1    Jan. 7, 2010

(30) Foreign Application Priority Data

Feb. 19, 2007    (FR) ..................................... 07 53352

(51) Int. Cl.
*F02C 7/32*    (2006.01)
*F02K 3/04*    (2006.01)
*F02C 9/16*    (2006.01)

(52) U.S. Cl. .............. 60/204; 60/226.1; 60/802; 60/805
(58) Field of Classification Search ................. 60/226.1, 60/802, 805, 806, 39.163, 773, 204; 415/125
See application file for complete search history.

(56) References Cited

U.S. PATENT DOCUMENTS

| | | | |
|---|---|---|---|
| 2,803,943 A | | 8/1957 | Rainbow |
| 3,375,996 A | * | 4/1968 | Wilde ........................... 60/226.1 |
| 3,680,309 A | * | 8/1972 | Wallace, Jr. ..................... 60/785 |
| 4,150,566 A | * | 4/1979 | Loebel et al. ............ 73/862.328 |
| 5,485,717 A | * | 1/1996 | Williams ......................... 60/773 |
| 6,647,708 B2 | * | 11/2003 | Bornhoft et al. ............. 60/226.1 |
| 7,246,482 B2 | * | 7/2007 | Mahoney et al. ............... 60/802 |
| 7,857,594 B2 | * | 12/2010 | Kidikian et al. ........... 416/223 A |
| 2005/0103931 A1 | * | 5/2005 | Morris et al. ................... 244/58 |

FOREIGN PATENT DOCUMENTS

| | | |
|---|---|---|
| EP | 1 617 053 A2 | 1/2006 |
| FR | 2 882 097 | 8/2006 |
| GB | 1 320 530 | 6/1973 |

* cited by examiner

*Primary Examiner* — Ted Kim
(74) *Attorney, Agent, or Firm* — Oblon, Spivak, McClelland, Maier & Neustadt, L.L.P.

(57) ABSTRACT

A method for producing the electrical power required for equipment on board an airplane is disclosed. Auxiliary power is taken off by a shaft driven by the high pressure turbine and, when idling, the efficiency of the low pressure turbine is degraded so as to enable the high pressure turbine to operate at a speed that is sufficient for delivering the required auxiliary power.

12 Claims, 1 Drawing Sheet

METHOD OF TAKING OFF AUXILIARY POWER FROM AN AIRPLANE TURBOJET, AND A TURBOJET FITTED TO IMPLEMENT SUCH A METHOD

The invention relates to producing the auxiliary power needed by equipment on board an airplane, the power being taken from the turbojet(s) of said airplane.

BACKGROUND OF THE INVENTION

In recent airplanes, electrical power requirements are becoming ever greater. Ever more powerful electricity generators are being used. Such an electricity generator is driven by a turbojet of the airplane. It is known to take off the required mechanical power from the shaft that is associated with the high pressure turbine. More particularly, a radial shaft is mechanically coupled to the axial shaft associated with said high pressure turbine, and said power is delivered to a gearbox that drives the electricity generator. When a large amount of electrical power is required, that solution gives rise to difficulties when the engine is idling, whether on the ground or in flight, because of the high level of torque required to drive the electricity generator. This torque tends to cause the high pressure turbine to operate in an undesirable operating range.

The invention seeks to improve that known system in order to take account of recent requirements in terms of auxiliary power, and consequently in order to take account of the new levels of torque that need to be delivered without affecting the operation of the high pressure turbine while idling.

The idea on which the invention is based consists, while idling, in degrading the efficiency of the low pressure turbine situated downstream from the high pressure turbine so as to make it possible to increase the speed of rotation of the high pressure turbine (to a level that enables a high level of power to be taken off therefrom) without causing an increase in the thrust from the engine, where such an increase is not desirable during stages when the engine is idling.

OBJECTS AND SUMMARY OF THE INVENTION

More precisely, the invention provides a method of taking auxiliary power from an airplane turbojet comprising, from upstream to downstream, a high pressure turbine and a low pressure turbine, the method being of the type consisting in taking off said power via a shaft driven by the high pressure turbine, wherein the improvement consists, within an idling operating range, in controlling degradation of the efficiency of said low pressure turbine so as to enable said high pressure turbine to operate at a speed that is sufficient for supplying the required auxiliary power.

Thus, the efficiency of the low pressure turbine is reduced so that it is caused to turn more slowly, while the high pressure turbine is turning more quickly.

Efficiency of the low pressure turbine can be degraded by acting on the radial clearance of the moving blades of said low pressure turbine.

It should be observed that varying the radial clearance of the moving blades is itself known (using a control of the low pressure turbine axis clearance control (LPTACC)) type, but dedicated to a different use.

According to another characteristic that is advantageous, a degradation in the efficiency of the low pressure turbine can be obtained by acting on the pitch of nozzle vanes of at least some stages of said turbine. A variable pitch system for the low pressure turbine nozzle vanes is used for varying the speed of rotation of the turbine (which can be considered as being a degradation of its efficiency). It is possible to combine both of these means.

An engine computer enables these parameters to be varied as a function of the speed of the engine and of electrical power requirements. Thus, it is possible to avoid an increase in engine thrust (by using a controlled loss in the efficiency of the low pressure turbine), thus enabling the speed of the high pressure turbine to be maintained at a level such that, in spite of a large amount of power being taken off therefrom, the operating point of said high pressure turbine remains above a critical value.

According to an advantageous characteristic, the efficiency variation of said low pressure turbine is servo-controlled to measurement of the torque delivered by a (conventional) mechanical transmission system arranged between the shaft driven by the high pressure turbine and an electricity generator.

The invention also provides an airplane turbojet comprising, from upstream to downstream, a high pressure turbine and a low pressure turbine, a shaft driven by said high pressure turbine, and a mechanical transmission system coupled to said shaft to take power therefrom, the turbojet including efficiency-varying means for varying the efficiency of said low pressure turbine and control means for controlling said efficiency-varying means, said control means being controlled by a sensor delivering a signal representative of the amount of auxiliary power being consumed.

The mechanical transmission system drives (amongst other pieces of equipment) one or more electricity generators.

Said efficiency-varying means may include a system for controlling the radial clearance of the moving blades of the low pressure turbine and/or a system for controlling the pitch of the nozzle vanes of said low pressure turbine.

Advantageously, said efficiency-varying means comprise a computer responsive to a torque sensor, itself associated with said mechanical transmission system arranged between said shaft driven by the high pressure turbine and said electricity generator.

BRIEF DESCRIPTION OF THE DRAWING

The invention can be better understood and other advantages thereof appear better in the light of the following description given purely by way of example and made with reference to the accompanying drawing, in which.

MORE DETAILED DESCRIPTION

Figure 1:
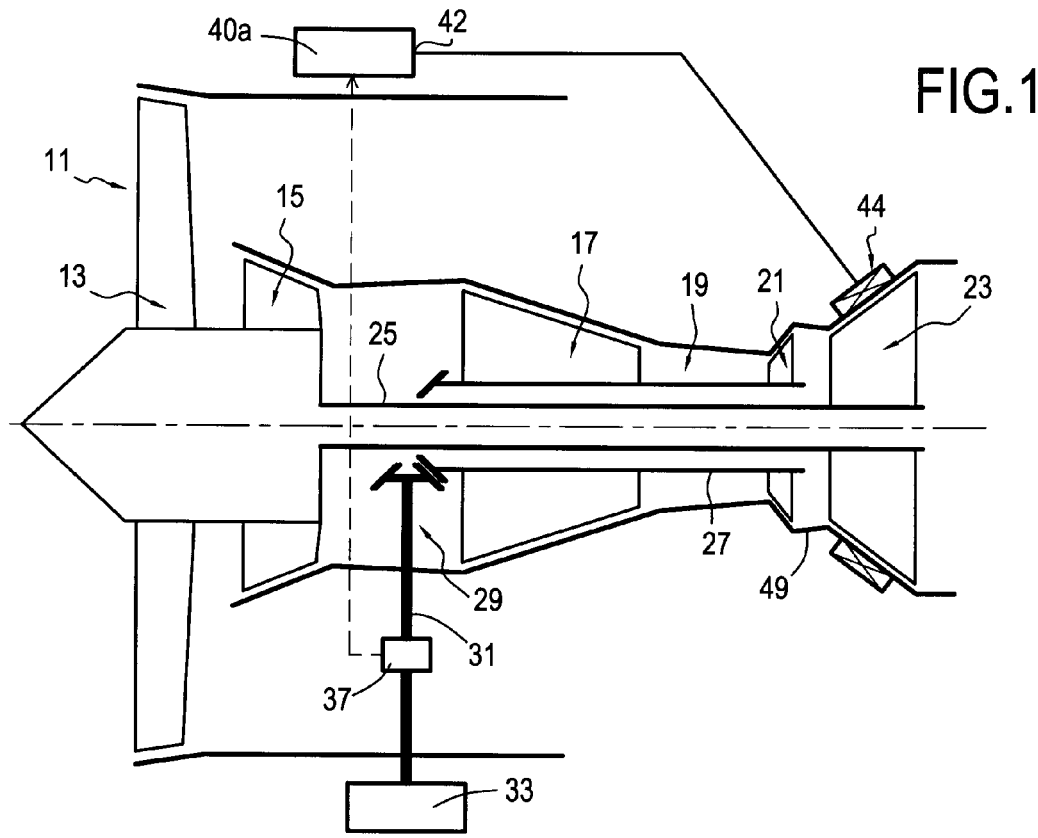
FIG. 1 is a diagrammatic section view of an airplane turbojet fitted with an auxiliary power takeoff system in accordance with the invention.
Figure 2:
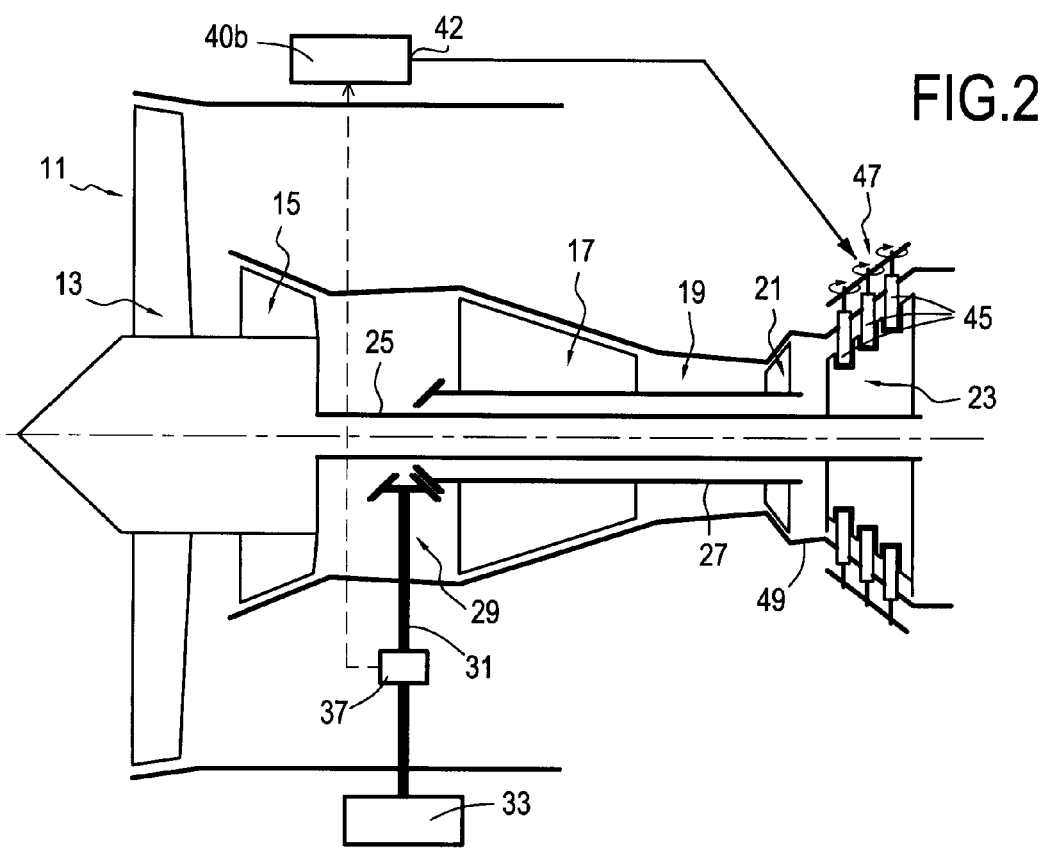
FIG. 2 is a view analogous to FIG. 1 showing a variant.

The two embodiments shown diagrammatically respectively in FIGS. 1 and 2 can be combined by providing a computer suitable for controlling the two systems that are liable to modify the efficiency of the low pressure turbine.

The bypass turbojet 11 shown in FIG. 1 comprises in conventional manner, from upstream to downstream: a fan 13; a low pressure compressor 15; a high pressure compressor 17; a combustion chamber 19; a high pressure turbine 21; and a low pressure turbine 23. The low pressure turbine 23 is mechanically connected to an axial shaft 25 driving both the fan 13 and the low pressure compressor 15. The high pressure turbine 21 is connected to an axial shaft 27 driving, in particular, the high pressure compressor 17. This subassembly is referred to as the high pressure spool. The shaft 27 is mechanically coupled to a mechanical transmission system 29 having a radial shaft 31 driving an electricity generator 33 via appropriate stepdown gearing.

Nowadays, the electricity generator 33 for delivering the electrical power required by on-board equipment and by all of the passenger cabin equipment needs to be a high power generator, thereby requiring a large amount of torque to be transmitted via the radial shaft 31.

In this example, the torque is measured by a torque sensor 37 associated with the radial shaft 31. The torque sensor delivers a signal representative of the torque delivered by the radial shaft 31, and consequently of the power taken from the high pressure turbine 21. This signal is applied to an input of a computer 40 suitable for controlling at least one structural parameter of the low pressure turbine. More particularly, this parameter is one of the parameters that enables the efficiency of said low pressure turbine to be varied (degraded) so that the high pressure turbine can operate at a sufficient speed when the engine is idling. The auxiliary power required can then be taken off, without the high pressure turbine operating in an operating domain that is not desired.

In the example of FIG. 1, the computer 40a incorporates the function of controlling the radial clearance for the moving blades of the low pressure turbine. The control output 42 from this computer thus acts on a system 44 (itself known) for controlling the radial clearance of the low pressure turbine. This clearance control system is of the LPTACC type; it is known for other applications. If the radial clearance of the blades increases, then the efficiency of the low pressure turbine is degraded, thus enabling the high pressure spool to be operated at above its critical speed without the thrust from the fan 13 becoming incompatible operating at idling speed.

In the example of FIG. 2, the general arrangement is the same and is not described again. However the computer 40b is now designed to incorporate the function of controlling the variable pitch of the nozzle vanes 45 of said low pressure turbine 23. Consequently, the nozzle vanes of this turbine are fitted with a pitch-varying system 47 that is actuated from the outside of the casing 49.

Naturally, as mentioned above, the computer may incorporate both of the above-mentioned control functions, namely control over the radial clearance of the moving blades and control over the variable pitch of the nozzle vanes.

The signal delivered by the torque sensor 37 is representative of the auxiliary power being drawn from the electricity generator 33. Consequently, the signal delivered by the torque sensor 37 is delivered to the computer, which deduces therefrom the extent to which the efficiency of the low pressure turbine 23 needs to be degraded in order to ensure that the operation of the high pressure spool can be maintained at a sufficient level while the engine is idling and without the thrust developed by the fan 13 becoming incompatible with proper idling operation.

What is claimed is:

1. A method of taking auxiliary power from an airplane dual-spool turbojet comprising, from upstream to downstream, a fan, a low pressure compressor, a high pressure compressor, a combustion chamber, a high pressure turbine and a low pressure turbine, wherein said low pressure turbine is mechanically connected to a first axial shaft which drives said fan and said low pressure compressor such that said fan produces thrust, said high pressure turbine is mechanically connected to a second axial shaft which drives said high pressure compressor, the method comprising:

taking off said power via a radial shaft mechanically coupled to said second axial shaft and driven by the high pressure turbine; and controlling degradation of efficiency of said low pressure turbine, within an idling operating range, to enable said high pressure turbine to operate at a speed that is sufficient for supplying the required auxiliary power, wherein the efficiency is degraded by increasing radial clearance of moving blades of said low pressure turbine using a low pressure turbine axis clearance control system, such that a rotation speed of said high pressure turbine is increased and the thrust produced by said fan is compatible with said turbojet operating at idling speed.

2. A method according to claim 1, wherein the variation in the efficiency of said low pressure turbine is servo-controlled to a measurement of the torque delivered by a mechanical transmission system arranged between said radial shaft driven by the high pressure turbine and an electricity generator.

3. A method according to claim 1, wherein the thrust produced by said fan when said turbojet is operating at idling speed does not increase when the rotation speed of said high pressure turbine is increased and the efficiency of said low pressure turbine is degraded.

4. An airplane dual-spool turbojet comprising, from upstream to downstream:

a fan, a low pressure compressor, a high pressure compressor, a combustion chamber, a high pressure turbine and a low pressure turbine, said low pressure turbine being mechanically connected to a first axial shaft which drives said fan and said low pressure compressor such that said fan produces thrust, said high pressure turbine being mechanically connected to a second axial shaft which drives said high pressure compressor;

a radial shaft mechanically coupled to said second axial shaft and driven by said high pressure turbine;

a mechanical transmission system coupled to said radial shaft to take power therefrom;

efficiency-varying means for varying the efficiency of said low pressure turbine; and control means for controlling said efficiency-varying means when the turbojet is operating within an idling range to enable said high pressure turbine to operate at a speed that is sufficient for supplying required auxiliary power, said control means being controlled by a sensor delivering a signal representative of the amount of auxiliary power being consumed, wherein said efficiency-varying means comprises a system for controlling radial clearance of moving blades of said low pressure turbine using a low pressure turbine axis clearance control system so as to reduce the efficiency of said low pressure turbine by increasing the radial clearance of said moving blades of said low pressure turbine such that a rotation speed of said high pressure turbine is increased and the thrust produced by said fan is compatible with said turbojet operating at idling speed.

5. A turbojet according to claim 4, wherein said efficiency-varying means comprise a computer controlled by a torque sensor associated with a mechanical transmission system arranged between said radial shaft driven by the high pressure turbine and an electricity generator.

6. A turbojet according to claim 4, wherein the thrust produced by said fan when said turbojet is operating at idling speed does not increase when the rotation speed of said high pressure turbine is increased and the efficiency of said low pressure turbine is degraded.

7. A method of taking auxiliary power from an airplane dual-spool turbojet comprising, from upstream to downstream, a fan, a low pressure compressor, a high pressure compressor, a combustion chamber, a high pressure turbine and a low pressure turbine, wherein said low pressure turbine is mechanically connected to a first axial shaft which drives said fan and said low pressure compressor such that said fan produces thrust, said high pressure turbine is mechanically connected to a second axial shaft which drives said high pressure compressor, the method comprising:

taking off said power via a radial shaft mechanically coupled to said second axial shaft and driven by the high pressure turbine; and controlling degradation of efficiency of said low pressure turbine, within an idling operating range, to enable said high pressure turbine to operate at a speed that is sufficient for supplying the required auxiliary power, wherein the efficiency is degraded by controlling a variable pitch of nozzle vanes of said low pressure turbine using a pitch-varying system which is actuated from outside of a casing, such that a rotation speed of said high pressure turbine is increased and the thrust produced by said fan is compatible with said turbojet operating at idling speed.

8. A method according to claim 7, wherein the variation in the efficiency of said low pressure turbine is servo-controlled to a measurement of the torque delivered by a mechanical transmission system arranged between said radial shaft driven by the high pressure turbine and an electricity generator.

9. A method according to claim 7, wherein the thrust produced by said fan when said turbojet is operating at idling speed does not increase when the rotation speed of said high pressure turbine is increased and the efficiency of said low pressure turbine is degraded.

10. An airplane turbojet comprising, from upstream to downstream:

a fan, a low pressure compressor, a high pressure compressor, a combustion chamber, a high pressure turbine and a low pressure turbine, said low pressure turbine being mechanically connected to a first axial shaft which drives said fan and said low pressure compressor such that said fan produces thrust, said high pressure turbine being mechanically connected to a second axial shaft which drives said high pressure compressor;

a radial shaft mechanically coupled to said second axial shaft and driven by said high pressure turbine;

a mechanical transmission system coupled to said radial shaft to take power therefrom;

efficiency-varying means for varying the efficiency of said low pressure turbine; and control means for controlling said efficiency-varying means when the turbojet is operating within an idling range to enable said high pressure turbine to operate at a speed that is sufficient for supplying required auxiliary power, said control means being controlled by a sensor delivering a signal representative of the amount of auxiliary power being consumed, wherein said efficiency-varying means includes a system for controlling the pitch of the nozzle vanes of said low pressure turbine using a pitch-varying system which is actuated from outside of a casing, such that a rotation speed of said high pressure turbine is increased and the thrust produced by said fan is compatible with said turbojet operating at idling speed.

11. A turbojet according to claim 10, wherein said efficiency-varying means includes a computer controlled by a torque sensor associated with a mechanical transmission system arranged between said radial shaft driven by the high pressure turbine and an electricity generator.

12. A turbojet according to claim 10, wherein the thrust produced by said fan when said turbojet is operating at idling speed does not increase when the rotation speed of said high pressure turbine is increased and the efficiency of said low pressure turbine is degraded.

\* \* \* \* \*